United States Patent
Singh

(10) Patent No.: US 8,650,124 B2
(45) Date of Patent: Feb. 11, 2014

(54) SYSTEM AND METHOD FOR PROCESSING PAYMENT TRANSACTION RECEIPTS

(71) Applicant: Shantnu Singh, Singapore (SG)

(72) Inventor: Shantnu Singh, Singapore (SG)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 13/849,685

(22) Filed: Mar. 25, 2013

(65) Prior Publication Data

US 2013/0218778 A1 Aug. 22, 2013

Related U.S. Application Data

(63) Continuation of application No. 12/962,571, filed on Dec. 7, 2010, now Pat. No. 8,429,048.

(60) Provisional application No. 61/290,391, filed on Dec. 28, 2009.

(51) Int. Cl.
G06Q 40/00 (2012.01)

(52) U.S. Cl.
USPC .............................................. 705/44; 705/35

(58) Field of Classification Search
USPC ...................................... 705/35–44
See application file for complete search history.

(56) References Cited

U.S. PATENT DOCUMENTS

| | | | |
|---|---|---|---|
| 3,935,933 A | | 2/1976 | Tanaka et al. |
| 4,011,433 A | * | 3/1977 | Tateisi et al. ................. 235/381 |
| 4,108,350 A | | 8/1978 | Forbes, Jr. |
| 4,114,027 A | | 9/1978 | Slater et al. |
| 4,124,109 A | * | 11/1978 | Bissell et al. ................. 194/210 |
| 4,195,864 A | | 4/1980 | Morton et al. |
| 4,412,631 A | * | 11/1983 | Haker ............................ 221/66 |
| 4,544,590 A | | 10/1985 | Egan |
| 4,568,403 A | | 2/1986 | Egan |
| 4,649,515 A | | 3/1987 | Thompson et al. |
| 4,674,041 A | | 6/1987 | Lemon et al. |
| 4,723,212 A | | 2/1988 | Mindrum et al. |
| 4,742,215 A | | 5/1988 | Daughters et al. |
| 4,794,530 A | | 12/1988 | Yukiura et al. |
| 4,825,053 A | | 4/1989 | Caille |
| 4,837,422 A | | 6/1989 | Dethloff et al. |
| 4,841,712 A | | 6/1989 | Roou |

(Continued)

FOREIGN PATENT DOCUMENTS

| AU | 200039412 A1 | 12/2000 |
|---|---|---|
| BE | 1002756 A6 | 5/1991 |

(Continued)

OTHER PUBLICATIONS

"Internet Based Secure Transactions Using Encrypting Applets and CGI-Scripts Independent of Browser or Server Capabilities"; 1998; pp. 800-801; No. 410116; IBM Research Disclosure.

(Continued)

*Primary Examiner* — Thu Thao Havan
(74) *Attorney, Agent, or Firm* — Kilpatrick Townsend & Stockton

(57) ABSTRACT

Embodiments of the invention are directed to systems and methods for processing payment transaction receipts. When an authorization request message for a transaction of a consumer is received, it is determined whether an account associated with the consumer's portable consumer device is enrolled in an electronic receipt program. If the account is enrolled, an electronic receipt for the transaction is sent to the consumer.

21 Claims, 10 Drawing Sheets

(56) References Cited

U.S. PATENT DOCUMENTS

| | | |
|---|---|---|
| 4,868,376 A | 9/1989 | Lessin et al. |
| 4,882,675 A | 11/1989 | Nichtberger et al. |
| 4,910,672 A | 3/1990 | Off et al. |
| 4,930,129 A | 5/1990 | Takahira |
| 4,941,090 A | 7/1990 | McCarthy |
| 4,949,256 A | 8/1990 | Humble |
| 4,954,003 A | 9/1990 | Shea |
| 4,970,658 A | 11/1990 | Durbin et al. |
| 4,985,615 A | 1/1991 | Iijima |
| 4,992,940 A | 2/1991 | Dworkin |
| 5,019,452 A | 5/1991 | Watanabe et al. |
| 5,019,695 A | 5/1991 | Itako |
| 5,025,372 A | 6/1991 | Burton et al. |
| 5,056,019 A | 10/1991 | Schultz et al. |
| 5,060,793 A | 10/1991 | Hyun et al. |
| 5,060,804 A | 10/1991 | Beales et al. |
| 5,063,596 A | 11/1991 | Dyke |
| 5,115,888 A | 5/1992 | Schneider |
| 5,117,355 A | 5/1992 | McCarthy |
| 5,128,752 A | 7/1992 | Von Kohorn |
| 5,161,256 A | 11/1992 | Iijima |
| 5,173,851 A | 12/1992 | Off et al. |
| 5,185,695 A | 2/1993 | Pruchnicki |
| 5,200,889 A | 4/1993 | Mori |
| 5,202,826 A | 4/1993 | McCarthy |
| 5,227,874 A | 7/1993 | Von Kohorn |
| 5,256,863 A | 10/1993 | Ferguson et al. |
| 5,285,278 A | 2/1994 | Holman |
| 5,287,181 A | 2/1994 | Holman |
| 5,287,268 A | 2/1994 | McCarthy |
| 5,299,834 A | 4/1994 | Kraige |
| 5,308,120 A | 5/1994 | Thompson |
| 5,353,218 A | 10/1994 | De Lapa et al. |
| 5,380,991 A | 1/1995 | Valencia et al. |
| RE34,915 E | 4/1995 | Nichtberger et al. |
| 5,402,549 A | 4/1995 | Forrest |
| 5,412,756 A | 5/1995 | Bauman et al. |
| 5,417,458 A | 5/1995 | Best et al. |
| 5,420,606 A | 5/1995 | Begum et al. |
| 5,450,938 A | 9/1995 | Rademacher |
| 5,466,010 A | 11/1995 | Spooner |
| 5,471,669 A | 11/1995 | Lidman |
| 5,473,690 A | 12/1995 | Grimonprez et al. |
| 5,483,444 A | 1/1996 | Heintzeman et al. |
| 5,484,998 A | 1/1996 | Bejnar et al. |
| 5,491,326 A | 2/1996 | Marceau et al. |
| 5,491,838 A | 2/1996 | Takahisa et al. |
| 5,500,681 A | 3/1996 | Jones |
| 5,501,491 A | 3/1996 | Thompson |
| 5,513,102 A | 4/1996 | Auriemma |
| 5,515,270 A | 5/1996 | Weinblatt |
| 5,530,232 A | 6/1996 | Taylor |
| 5,531,482 A | 7/1996 | Blank |
| 5,535,118 A | 7/1996 | Chumbley |
| 5,537,314 A | 7/1996 | Kanter |
| 5,559,313 A | 9/1996 | Claus et al. |
| 5,564,073 A | 10/1996 | Takahisa |
| 5,577,266 A | 11/1996 | Takahisa et al. |
| 5,577,915 A | 11/1996 | Feldman |
| 5,578,808 A | 11/1996 | Taylor |
| 5,579,537 A | 11/1996 | Takahisa |
| 5,590,038 A | 12/1996 | Pitroda |
| 5,594,493 A | 1/1997 | Nemirofsky |
| 5,612,868 A | 3/1997 | Off et al. |
| 5,621,812 A | 4/1997 | Deaton et al. |
| 5,642,485 A | 6/1997 | Deaton et al. |
| 5,644,723 A | 7/1997 | Deaton et al. |
| 5,649,114 A | 7/1997 | Deaton et al. |
| 5,649,118 A | 7/1997 | Carlisle et al. |
| 5,650,209 A | 7/1997 | Ramsburg et al. |
| 5,687,322 A | 11/1997 | Deaton et al. |
| 5,689,100 A | 11/1997 | Carrithers et al. |
| 5,710,886 A | 1/1998 | Christensen et al. |
| 5,727,153 A | 3/1998 | Powell |
| 5,734,838 A | 3/1998 | Robinson et al. |
| 5,739,512 A | 4/1998 | Tognazzini |
| 5,742,845 A | 4/1998 | Wagner |
| 5,754,762 A | 5/1998 | Kuo et al. |
| 5,761,648 A | 6/1998 | Golden et al. |
| 5,765,141 A | 6/1998 | Spector |
| 5,767,896 A | 6/1998 | Nemirofsky |
| 5,774,870 A | 6/1998 | Storey |
| 5,776,287 A | 7/1998 | Best et al. |
| 5,790,677 A | 8/1998 | Fox et al. |
| 5,791,991 A | 8/1998 | Small |
| 5,794,210 A | 8/1998 | Goldhaber et al. |
| 5,797,126 A | 8/1998 | Helbling et al. |
| 5,802,519 A | 9/1998 | De Jong |
| 5,804,806 A | 9/1998 | Haddad et al. |
| 5,806,044 A | 9/1998 | Powell |
| 5,806,045 A | 9/1998 | Biorge et al. |
| 5,815,658 A | 9/1998 | Kuriyama |
| 5,822,735 A | 10/1998 | De Lapa et al. |
| 5,822,737 A | 10/1998 | Ogram |
| 5,832,457 A | 11/1998 | O'Brien et al. |
| 5,844,218 A | 12/1998 | Kawan et al. |
| 5,845,259 A | 12/1998 | West et al. |
| 5,855,007 A | 12/1998 | Jovicic et al. |
| 5,857,175 A | 1/1999 | Day et al. |
| 5,859,419 A | 1/1999 | Wynn |
| RE36,116 E | 2/1999 | McCarthy |
| 5,865,340 A | 2/1999 | Alvern |
| 5,865,470 A | 2/1999 | Thompson |
| 5,868,498 A | 2/1999 | Martin |
| 5,878,337 A | 3/1999 | Joao et al. |
| 5,880,769 A | 3/1999 | Nemirofsky et al. |
| 5,884,271 A | 3/1999 | Pitroda |
| 5,884,277 A | 3/1999 | Khosla |
| 5,884,278 A | 3/1999 | Powell |
| 5,887,271 A | 3/1999 | Powell |
| 5,890,135 A | 3/1999 | Powell |
| 5,892,824 A | 4/1999 | Beatson et al. |
| 5,892,827 A | 4/1999 | Beach et al. |
| 5,898,838 A | 4/1999 | Wagner |
| 5,899,998 A | 5/1999 | McGauley et al. |
| 5,903,732 A | 5/1999 | Reed et al. |
| 5,905,246 A | 5/1999 | Fajkowski |
| 5,905,908 A | 5/1999 | Wagner |
| 5,907,350 A | 5/1999 | Nemirofsky |
| 5,907,830 A | 5/1999 | Engel et al. |
| 5,909,486 A | 6/1999 | Walker et al. |
| 5,912,453 A | 6/1999 | Gungl et al. |
| 5,915,019 A | 6/1999 | Ginter et al. |
| 5,915,244 A | 6/1999 | Jack et al. |
| 5,921,686 A | 7/1999 | Baird et al. |
| 5,923,735 A | 7/1999 | Swartz et al. |
| 5,923,884 A | 7/1999 | Peyret et al. |
| 5,924,072 A | 7/1999 | Havens |
| 5,926,795 A | 7/1999 | Williams |
| 5,928,082 A | 7/1999 | Clapper, Jr. |
| 5,931,947 A | 8/1999 | Burns et al. |
| 5,943,651 A | 8/1999 | Oosawa |
| 5,950,173 A | 9/1999 | Perkowski |
| 5,953,047 A | 9/1999 | Nemirofsky |
| 5,953,705 A | 9/1999 | Oneda |
| 5,956,694 A | 9/1999 | Powell |
| 5,956,695 A | 9/1999 | Carrithers et al. |
| 5,958,174 A | 9/1999 | Ramsburg et al. |
| 5,960,082 A | 9/1999 | Haenel |
| 5,963,917 A | 10/1999 | Ogram |
| 5,969,318 A | 10/1999 | Mackenthun |
| 5,970,469 A | 10/1999 | Scroggie et al. |
| 5,974,399 A | 10/1999 | Giuliani et al. |
| 5,974,549 A | 10/1999 | Golan |
| 5,978,013 A | 11/1999 | Jones et al. |
| 5,987,795 A | 11/1999 | Wilson |
| 5,997,042 A | 12/1999 | Blank |
| 6,000,608 A | 12/1999 | Dorf |
| 6,002,771 A | 12/1999 | Nielsen |
| 6,003,113 A | 12/1999 | Hoshino |
| 6,003,134 A | 12/1999 | Kuo et al. |
| 6,005,942 A | 12/1999 | Chan et al. |
| 6,009,411 A | 12/1999 | Kepecs |
| 6,012,635 A | 1/2000 | Shimada et al. |

(56) References Cited

U.S. PATENT DOCUMENTS

| | | |
|---|---|---|
| 6,014,634 A | 1/2000 | Scroggie et al. |
| 6,024,286 A | 2/2000 | Bradley et al. |
| 6,035,280 A | 3/2000 | Christensen |
| 6,038,551 A | 3/2000 | Barlow et al. |
| 6,041,309 A | 3/2000 | Laor |
| 6,047,325 A | 4/2000 | Jain et al. |
| 6,049,778 A | 4/2000 | Walker et al. |
| 6,052,468 A | 4/2000 | Hillhouse |
| 6,052,690 A | 4/2000 | De Jong |
| 6,052,785 A | 4/2000 | Lin et al. |
| 6,055,509 A | 4/2000 | Powell |
| 6,055,573 A | 4/2000 | Gardenswartz et al. |
| 6,061,660 A | 5/2000 | Eggleston et al. |
| 6,067,526 A | 5/2000 | Powell |
| 6,067,529 A | 5/2000 | Ray et al. |
| 6,070,147 A | 5/2000 | Harms et al. |
| 6,073,238 A | 6/2000 | Drupsteen |
| 6,076,068 A | 6/2000 | Delapa |
| 6,076,069 A | 6/2000 | Laor |
| 6,089,611 A | 7/2000 | Blank |
| 6,094,656 A | 7/2000 | De Jong |
| 6,101,422 A | 8/2000 | Furlong |
| 6,101,477 A | 8/2000 | Hohle et al. |
| 6,105,002 A | 8/2000 | Powell |
| 6,105,865 A | 8/2000 | Hardesty |
| 6,105,873 A | 8/2000 | Jeger |
| 6,112,987 A | 9/2000 | Lambert et al. |
| 6,112,988 A | 9/2000 | Powell |
| 6,119,933 A | 9/2000 | Wong et al. |
| 6,119,945 A | 9/2000 | Muller et al. |
| 6,122,631 A | 9/2000 | Berbec et al. |
| 6,129,274 A | 10/2000 | Suzuki |
| 6,135,351 A | 10/2000 | Shiobara et al. |
| 6,142,369 A | 11/2000 | Jonstromer |
| 6,144,948 A | 11/2000 | Walker et al. |
| 6,151,586 A | 11/2000 | Brown |
| 6,151,587 A | 11/2000 | Matthias |
| 6,154,751 A | 11/2000 | Ault et al. |
| 6,161,870 A | 12/2000 | Blank |
| 6,164,549 A | 12/2000 | Richards |
| 6,170,061 B1 | 1/2001 | Beser |
| 6,173,269 B1 | 1/2001 | Solokl et al. |
| 6,173,891 B1 | 1/2001 | Powell |
| 6,179,205 B1 | 1/2001 | Sloan |
| 6,179,710 B1 | 1/2001 | Sawyer et al. |
| 6,182,891 B1 | 2/2001 | Furuhashi et al. |
| 6,183,017 B1 | 2/2001 | Najor et al. |
| 6,185,541 B1 | 2/2001 | Scroggie et al. |
| 6,189,100 B1 | 2/2001 | Barr et al. |
| 6,189,878 B1 | 2/2001 | Meese |
| 6,195,666 B1 | 2/2001 | Schneck et al. |
| 6,205,435 B1 | 3/2001 | Biffar |
| 6,210,276 B1 | 4/2001 | Mullins |
| 6,216,014 B1 | 4/2001 | Proust et al. |
| 6,216,204 B1 | 4/2001 | Thiriet |
| 6,220,510 B1 | 4/2001 | Everett et al. |
| 6,222,914 B1 | 4/2001 | McMullin |
| 6,230,143 B1 | 5/2001 | Simons et al. |
| 6,237,145 B1 | 5/2001 | Narasimhan et al. |
| 6,241,287 B1 | 6/2001 | Best et al. |
| 6,243,687 B1 | 6/2001 | Powell |
| 6,243,688 B1 | 6/2001 | Kalina |
| 6,244,958 B1 | 6/2001 | Acres |
| 6,246,997 B1 | 6/2001 | Cybul et al. |
| 6,266,647 B1 | 7/2001 | Fernandez |
| 6,267,263 B1 | 7/2001 | Emoff et al. |
| 6,269,158 B1 | 7/2001 | Kim |
| 6,279,112 B1 | 8/2001 | O'Toole, Jr. et al. |
| 6,282,516 B1 | 8/2001 | Giuliani |
| 6,292,785 B1 | 9/2001 | McEvoy et al. |
| 6,292,786 B1 | 9/2001 | Deaton et al. |
| 6,296,191 B1 | 10/2001 | Hamann et al. |
| 6,299,530 B1 | 10/2001 | Hansted et al. |
| 6,321,208 B1 | 11/2001 | Barnett et al. |
| 6,325,285 B1 | 12/2001 | Baratelli |
| 6,327,576 B1 | 12/2001 | Ogasawara |
| 6,341,353 B1 | 1/2002 | Herman et al. |
| 6,385,723 B1 | 5/2002 | Richards |
| 6,390,374 B1 | 5/2002 | Carper et al. |
| 6,394,341 B1 | 5/2002 | Makipaa et al. |
| 6,397,194 B1 | 5/2002 | Houvener et al. |
| 6,442,571 B1 | 8/2002 | Haff et al. |
| 6,480,935 B1 | 11/2002 | Carper et al. |
| 6,487,540 B1 | 11/2002 | Smith et al. |
| 6,516,996 B1 | 2/2003 | Hippelainen |
| 6,533,168 B1 | 3/2003 | Ching |
| 6,543,683 B2 | 4/2003 | Hoffman |
| 6,549,773 B1 | 4/2003 | Linden et al. |
| 6,549,912 B1 | 4/2003 | Chen |
| 6,561,417 B1 | 5/2003 | Gadd |
| 6,612,490 B1 | 9/2003 | Herrendoerfer et al. |
| 6,653,940 B2 | 11/2003 | Collura |
| 6,681,995 B2 | 1/2004 | Sukeda et al. |
| 6,689,345 B2 | 2/2004 | Lezer |
| 6,772,434 B1 | 8/2004 | Godwin |
| 6,898,598 B2 | 5/2005 | Himmel et al. |
| 6,975,856 B2 | 12/2005 | Ogasawara |
| 7,069,240 B2 | 6/2006 | Spero et al. |
| 7,082,415 B1 | 7/2006 | Robinson et al. |
| 7,088,467 B1 | 8/2006 | Voss et al. |
| 7,318,049 B2 | 1/2008 | Iannacci |
| 7,356,541 B1 | 4/2008 | Doughty |
| 7,461,780 B2 | 12/2008 | Potts et al. |
| 7,487,912 B2 | 2/2009 | Seifert et al. |
| 7,552,087 B2 | 6/2009 | Schultz et al. |
| 7,725,369 B2 | 5/2010 | Shiftan |
| 7,748,621 B2 | 7/2010 | Gusler et al. |
| 7,827,077 B2 | 11/2010 | Shiftan et al. |
| 8,025,216 B2 | 9/2011 | Potts et al. |
| 8,180,682 B2 | 5/2012 | Narayanaswami et al. |
| 8,429,048 B2 | 4/2013 | Singh |
| 2001/0016835 A1 | 8/2001 | Hansmann et al. |
| 2001/0029483 A1 | 10/2001 | Schultz et al. |
| 2001/0037312 A1 | 11/2001 | Gray et al. |
| 2002/0002468 A1 | 1/2002 | Spagna et al. |
| 2002/0073025 A1 | 6/2002 | Tanner et al. |
| 2002/0073043 A1 | 6/2002 | Herman et al. |
| 2002/0073331 A1 | 6/2002 | Candelore |
| 2002/0076051 A1 | 6/2002 | Nii |
| 2002/0077974 A1 | 6/2002 | Ortiz |
| 2002/0077992 A1 | 6/2002 | Tobin |
| 2002/0087894 A1 | 7/2002 | Foley et al. |
| 2002/0128878 A1 | 9/2002 | Maritzen et al. |
| 2002/0138354 A1 | 9/2002 | Seal et al. |
| 2002/0179704 A1 | 12/2002 | Deaton |
| 2002/0188561 A1 | 12/2002 | Schultz |
| 2003/0014372 A1 | 1/2003 | Wheeler et al. |
| 2003/0055733 A1 | 3/2003 | Marshall et al. |
| 2003/0055792 A1 | 3/2003 | Kinoshita et al. |
| 2003/0093344 A1 | 5/2003 | Sesek |
| 2003/0121969 A1 | 7/2003 | Wankmueller |
| 2003/0126020 A1 | 7/2003 | Smith et al. |
| 2003/0182204 A1 | 9/2003 | Rhee |
| 2003/0187794 A1 | 10/2003 | Irwin et al. |
| 2003/0233279 A1 | 12/2003 | Shinzaki |
| 2004/0030601 A1 | 2/2004 | Pond et al. |
| 2004/0064373 A1 | 4/2004 | Shannon |
| 2004/0128243 A1 | 7/2004 | Kavanagh et al. |
| 2004/0141661 A1 | 7/2004 | Hanna et al. |
| 2004/0204078 A1 | 10/2004 | Fare et al. |
| 2004/0220964 A1 | 11/2004 | Shiftan et al. |
| 2004/0225567 A1 | 11/2004 | Mitchell et al. |
| 2005/0010505 A1 | 1/2005 | Darrell |
| 2005/0018670 A1 | 1/2005 | Shigematsu et al. |
| 2005/0076110 A1 | 4/2005 | Mathew et al. |
| 2005/0080726 A1 | 4/2005 | Krajewski et al. |
| 2005/0165651 A1 | 7/2005 | Mohan |
| 2005/0172033 A1 | 8/2005 | Mathew et al. |
| 2005/0216354 A1 | 9/2005 | Bam et al. |
| 2006/0004746 A1 | 1/2006 | Angus et al. |
| 2006/0022033 A1 | 2/2006 | Smets et al. |
| 2006/0253392 A1 | 11/2006 | Davies |
| 2006/0261149 A1 | 11/2006 | Raghavendra Tulluri |
| 2006/0273163 A1 | 12/2006 | Gusler et al. |

(56) References Cited

U.S. PATENT DOCUMENTS

| | | |
|---|---|---|
| 2007/0055630 A1 | 3/2007 | Gauthier et al. |
| 2007/0069013 A1 | 3/2007 | Seifert et al. |
| 2007/0094154 A1 | 4/2007 | Rau et al. |
| 2007/0100691 A1 | 5/2007 | Patterson |
| 2007/0136211 A1 | 6/2007 | Brown et al. |
| 2007/0205274 A1 | 9/2007 | Bridges |
| 2007/0205275 A1 | 9/2007 | Nicola et al. |
| 2007/0214049 A1 | 9/2007 | Postrel |
| 2008/0040285 A1 | 2/2008 | Wankmueller |
| 2008/0048022 A1 | 2/2008 | Vawter |
| 2008/0059375 A1 | 3/2008 | Abifaker |
| 2008/0207203 A1 | 8/2008 | Arthur et al. |
| 2008/0208743 A1 | 8/2008 | Arthur et al. |
| 2008/0208762 A1 | 8/2008 | Arthur et al. |
| 2008/0208764 A1 | 8/2008 | Diffenderffer |
| 2008/0313062 A1 | 12/2008 | Williams et al. |
| 2009/0037281 A1 | 2/2009 | Devlin et al. |
| 2009/0089194 A1 | 4/2009 | Mathis et al. |
| 2009/0099961 A1 | 4/2009 | Ogilvy |
| 2009/0106053 A1 | 4/2009 | Walker et al. |
| 2009/0119278 A1 | 5/2009 | Cross et al. |
| 2009/0140839 A1 | 6/2009 | Bishop et al. |
| 2009/0248557 A1 | 10/2009 | Reed et al. |
| 2009/0265252 A1 | 10/2009 | Fletcher |
| 2009/0271211 A1 | 10/2009 | Hammad et al. |
| 2009/0271263 A1 | 10/2009 | Regmi et al. |
| 2009/0271265 A1 | 10/2009 | Lay et al. |
| 2010/0082444 A1 | 4/2010 | Lin et al. |
| 2010/0100434 A1 | 4/2010 | Sock |
| 2010/0257066 A1 | 10/2010 | Jones et al. |
| 2011/0106714 A1 | 5/2011 | Junger |
| 2012/0011009 A1 | 1/2012 | Lindsey et al. |
| 2012/0123943 A1 | 5/2012 | Potts et al. |
| 2012/0160911 A1 | 6/2012 | Smith et al. |
| 2012/0203605 A1 | 8/2012 | Morgan et al. |
| 2012/0203646 A1 | 8/2012 | Morgan et al. |
| 2012/0203672 A1 | 8/2012 | Morgan et al. |
| 2012/0203695 A1 | 8/2012 | Morgan et al. |
| 2012/0203697 A1 | 8/2012 | Morgan et al. |
| 2012/0209749 A1 | 8/2012 | Hammad et al. |
| 2012/0221446 A1 | 8/2012 | Grigg et al. |
| 2012/0253852 A1 | 10/2012 | Pourfallah et al. |
| 2012/0253915 A1 | 10/2012 | Sock |
| 2012/0253958 A1 | 10/2012 | Sock et al. |
| 2012/0271712 A1 | 10/2012 | Katzin et al. |
| 2012/0278193 A1 | 11/2012 | Groat et al. |
| 2012/0284130 A1 | 11/2012 | Lewis et al. |
| 2012/0290422 A1 | 11/2012 | Bhinder |

FOREIGN PATENT DOCUMENTS

| | | |
|---|---|---|
| CA | 2293944 A1 | 8/2000 |
| CA | 2267041 A1 | 9/2000 |
| CA | 2684 434 A1 | 1/2001 |
| CA | 2317138 A1 | 1/2002 |
| DE | 19522527 A1 | 1/1997 |
| DE | 19848712 A1 | 4/2000 |
| DE | 19960978 A1 | 8/2000 |
| DE | 10015103 A1 | 10/2000 |
| EP | 203424 A2 | 12/1986 |
| EP | 292248 A2 | 11/1988 |
| EP | 475837 A1 | 3/1992 |
| EP | 540095 A1 | 5/1993 |
| EP | 658862 A2 | 6/1995 |
| EP | 675614 A1 | 10/1995 |
| EP | 682327 A2 | 11/1995 |
| EP | 875841 A2 | 11/1998 |
| EP | 936530 A1 | 8/1999 |
| EP | 938050 A2 | 8/1999 |
| EP | 938051 A2 | 8/1999 |
| EP | 944007 A2 | 9/1999 |
| EP | 949595 A2 | 10/1999 |
| EP | 982692 A2 | 3/2000 |
| EP | 984404 A2 | 3/2000 |
| EP | 1085395 A2 | 3/2001 |
| EP | 1102320 A1 | 5/2001 |
| EP | 1111505 A1 | 6/2001 |
| EP | 1113387 A2 | 7/2001 |
| EP | 1113407 A2 | 7/2001 |
| EP | 1168137 A1 | 1/2002 |
| EP | 1233333 A1 | 8/2002 |
| FR | 2772957 A1 | 6/1999 |
| FR | 2793048 A1 | 11/2000 |
| FR | 2794543 A1 | 12/2000 |
| FR | 2796176 A1 | 1/2001 |
| FR | 2804234 A1 | 7/2001 |
| GB | 2331381 A | 5/1999 |
| GB | 2343091 A | 4/2000 |
| GB | 2351379 A | 12/2000 |
| GB | 2355324 A | 4/2001 |
| JP | 2000112864 A | 4/2000 |
| JP | 2000181764 A | 6/2000 |
| JP | 2001202484 A | 7/2001 |
| JP | 2001236232 A | 8/2001 |
| JP | 2008-140298 A | 6/2008 |
| KR | 10-2000-0039297 A | 5/2001 |
| KR | 2001-0044823 A | 6/2001 |
| KR | 2001-0058742 A | 7/2001 |
| KR | 2002-0021237 A | 3/2002 |
| KR | 10-2002-0051488 A | 6/2002 |
| KR | 10-0795142 B1 | 1/2008 |
| WO | 90/16126 A1 | 12/1990 |
| WO | 96/25724 A1 | 8/1996 |
| WO | 96/38945 A1 | 12/1996 |
| WO | 96/42109 A1 | 12/1996 |
| WO | 97/05582 A1 | 2/1997 |
| WO | 97/10562 A1 | 3/1997 |
| WO | 97/39424 A1 | 10/1997 |
| WO | 98/02834 A1 | 1/1998 |
| WO | 98/09257 A1 | 3/1998 |
| WO | 98/20465 A1 | 5/1998 |
| WO | 98/43169 A2 | 10/1998 |
| WO | 98/43212 A1 | 10/1998 |
| WO | 98/52153 A2 | 11/1998 |
| WO | 99/10824 A1 | 3/1999 |
| WO | 91/19846 A2 | 4/1999 |
| WO | 99/16030 A1 | 4/1999 |
| WO | 99/44172 A1 | 9/1999 |
| WO | 99/45507 A1 | 9/1999 |
| WO | 99/49415 A2 | 9/1999 |
| WO | 99/49426 A1 | 9/1999 |
| WO | 01/13572 A1 | 2/2000 |
| WO | 00/39714 A1 | 7/2000 |
| WO | 00/46665 A2 | 8/2000 |
| WO | 00/54507 A1 | 9/2000 |
| WO | 00/57315 A2 | 9/2000 |
| WO | 00/57613 A1 | 9/2000 |
| WO | 00/62265 A1 | 10/2000 |
| WO | 00/62472 A1 | 10/2000 |
| WO | 00/67185 A1 | 11/2000 |
| WO | 00/68797 A1 | 11/2000 |
| WO | 00/68902 A1 | 11/2000 |
| WO | 00/68903 A1 | 11/2000 |
| WO | 00/69183 A2 | 11/2000 |
| WO | 00/75775 A2 | 12/2000 |
| WO | 00/77750 A1 | 12/2000 |
| WO | 00/79411 A2 | 12/2000 |
| WO | 01/04851 A1 | 1/2001 |
| WO | 01/06341 A1 | 1/2001 |
| WO | 01/08087 A1 | 2/2001 |
| WO | 01/15397 A1 | 3/2001 |
| WO | 01/18633 A1 | 3/2001 |
| WO | 01/18746 A1 | 3/2001 |
| WO | 0114995 | 3/2001 |
| WO | 01/29672 A1 | 4/2001 |
| WO | 01/33390 A2 | 5/2001 |
| WO | 0131535 | 5/2001 |
| WO | 01/40908 A2 | 6/2001 |
| WO | 01/42887 A2 | 6/2001 |
| WO | 01/44900 A2 | 6/2001 |
| WO | 01/44949 A2 | 6/2001 |
| WO | 01/47176 A1 | 6/2001 |
| WO | 01/50229 A2 | 7/2001 |

(56) References Cited

FOREIGN PATENT DOCUMENTS

| | | |
|---|---|---|
| WO | 01/52575 A1 | 7/2001 |
| WO | 01/55955 A1 | 8/2001 |
| WO | 01/59563 A1 | 8/2001 |
| WO | 01/61620 A1 | 8/2001 |
| WO | 01/65545 A1 | 9/2001 |
| WO | 01/67694 A1 | 9/2001 |
| WO | 01/71648 A2 | 9/2001 |
| WO | 01/71679 A2 | 9/2001 |
| WO | 01/73530 A2 | 10/2001 |
| WO | 01/73533 A1 | 10/2001 |
| WO | 01/78020 A1 | 10/2001 |
| WO | 01/80563 A1 | 10/2001 |
| WO | 01/84377 A2 | 11/2001 |
| WO | 01/84474 A2 | 11/2001 |
| WO | 01/84512 A1 | 11/2001 |
| WO | 01/88705 A1 | 11/2001 |
| WO | 02/06948 A1 | 1/2002 |
| WO | 02/10962 A1 | 2/2002 |
| WO | 02/14991 A2 | 2/2002 |
| WO | 02/15037 A1 | 2/2002 |
| WO | 02/21315 A1 | 3/2002 |
| WO | 02/29577 A2 | 4/2002 |
| WO | 02/088895 A2 | 11/2002 |
| WO | 2005086593 | 9/2005 |
| WO | 2006/077281 A1 | 7/2006 |
| WO | 2007038296 | 4/2007 |
| WO | 2007123856 | 11/2007 |

OTHER PUBLICATIONS

Anderson, Alan; "Reading Between the Lines"; Aug. 2000, Enterprise Systems Journal, vol. 15, No. 8, pp. 44.
Commerce unplugged: welcome to the world of wireless commerce. Canadian Grocer: Toronto, Jun. 2001. vol. 115, Issue 5, p. 38.
James G Xack; Electronic Project Documentation; AACE International Transaction, Morgantown 2002; PG CD61, 8 pages.
Kennedy, Kristen; "The Incredible Shrinking Form Factor"; 2002, CRN, vol. 996, pp. 46-50.
U.S. Provisional Appl. No. 61/467,710, filed May 2, 2003, 20 pages.
Office Action from U.S. Appl. No. 10/676,508, dated Apr. 16, 2008.
Office Action from U.S. Appl. No. 10/676,508, dated Sep. 26, 2008.
The International Search Report from Application No. PCT/US2008/076770, dated Nov. 18, 2008, 1 page.
The International Written Opinion from Application No. PCT/US2008/076770, dated Nov. 18, 2008, 4 pages.
Office Action from U.S. Appl. No. 10/676,508, dated Mar. 11, 2009.
Office Action from U.S. Appl. No. 12/359,251, dated May 1, 2009.
Office Action from U.S. Appl. No. 12/359,248, dated May 27, 2009.
Office Action from U.S. Appl. No. 12/359,244, dated May 28, 2009.
The International Search Report from Application No. PCT/US2009/046402, dated Jul. 23, 2009, 1 page.
The International Written Opinion from Application No. PCT/US2009/046402, dated Jul. 23, 2009, 5 pages.
Office Action from U.S. Appl. No. 10/676,508, dated Oct. 15, 2009.
U.S. Appl. No. 61/287,071, filed Dec. 16, 2009, 24 pages.
The International Search Report from Application No. PCT/US2009/041951, dated Dec. 17, 2009, 4 pages.
The International Written Opinion from Application No. PCT/US2009/041951, dated Dec. 17, 2009, 7 pages.
U.S. Appl. No. 61/290,391, filed Dec. 28, 2009, 19 pages.
Office Action from U.S. Appl. No. 12/359,248, dated Jan. 7, 2010.
Office Action from U.S. Appl. No. 12/359,244, dated Jan. 8, 2010.
Notice of Allowance from U.S. Appl. No. 12/359,251, dated Jan. 11, 2010.
U.S. Appl. No. 61/306,384, filed Feb. 19, 2010, 12 pages.
U.S. Appl. No. 61/323,235, filed Apr. 12, 2010, 19 pages.
U.S. Appl. No. 10/676,508, filed on Sep. 30, 2003.
Office Action from U.S. Appl. No. 12/359,244, dated Jun. 8, 2010.
Office Action from U.S. Appl. No. 12/359,248, dated Jun. 8, 2010.
Office Action from U.S. Appl. No. 12/359,248, dated Jan. 27, 2012.
Notice of Allowance from U.S. Appl. No. 10/676,508, dated Jun. 25, 2010.
U.S. Appl. No. 61/435,771, filed Jan. 24, 2011, 25 pages.
"Cryptomathic: Use your mobile phone to pay for your groceries and get cash from ATMs; Scandinavian partnership launches secure payment mechanism that turns mobile phones into mobile wallets." M2 Presswire Feb. 19, 2002 ProQuest Newsstand, ProQuest. Web. Jan. 27, 2011.
Office Action from U.S. Appl. No. 12/359,248, dated Feb. 2, 2011.
Notice of Allowance from U.S. Appl. No. 12/359,244, dated Feb. 4, 2011.
U.S. Appl. No. 61/466,409, filed Mar. 22, 2011, 395 pages.
U.S. Appl. No. 61/467,890, filed Mar. 25, 2011, 79 pages.
U.S. Appl. No. 61/467,969, filed Mar. 25, 2011, 90 pages.
U.S. Appl. No. 61/471,092, filed Apr. 1, 2011, 83 pages.
U.S. Appl. No. 61/485,029, filed May 11, 2011, 20 pages.
The International Search Report for Application PCT/US2010/059299, dated Jun. 28, 2011, 5 pages.
The International Search Report for Application PCT/US2010/061462, dated Aug. 24, 2011, 5 pages.
The International Written Opinion for Application PCT/US2010/061462, dated Aug. 24, 2011, 5 pages.
U.S. Appl. No. 12/953,165, filed Nov. 23, 2010, Ayman A. Hammad, entitled: "Merchant Alerts Incorporating Receipt Data", 86 pgs.
International Search Report dated Aug. 24, 2011 from International Patent Application No. PCT/US2010/061462, 2 pages.
International Preliminary Report on Patentability Issued in PCT/US2010/061462 on Jul. 12, 2012, 7 pages.
U.S. Appl. No. 13/470,026, filed May 11, 2012, Juliene Britt, entitled: "Electronic Receipt Manager Apparatuses, Methods and Systems", 127 pages.
International Search Report and Written Opinion mailed on Sep. 21, 2012 corresponding to PCT/US12/37597.
International Search Report mailed on Nov. 1, 2005 for PCT Patent Application No. PCT/US2004/013850, 1 page.
Written Opinion of the International Searching Authority mailed on Nov. 1, 2005 for PCT Patent Application No. PCT/US2004/013850, 3 pages.
Final Office Action mailed on Jan. 8, 2010 for U.S. Appl. No. 12/359,244, filed Jan. 23, 2009, 14 pages.
Non-Final Office Action mailed on Mar. 19, 2012 for U.S. Appl. No. 12/886,441, filed Sep. 20, 2010, 12 pages.
Non-Final Office Action mailed on Jun. 21, 2012 for U.S. Appl. No. 12/359,896, filed Jan. 26, 2009, 8 pages.
Final Office Action mailed on Jan. 18, 2013 for U.S. Appl. No. 12/359,896, filed Jan. 26, 2009, 14 pages.
Notice of Allowance mailed on Aug. 31, 2012 for U.S. Appl. No. 12/886,441, filed Sep. 20, 2010, 7 pages.
Non-Final Office Action mailed on Jun. 8, 2010 for U.S. Appl. No. 12/359,248, filed Jan. 23, 2009, 14 pages.
Non-Final Office Action mailed on Jun. 21, 2011 for U.S. Appl. No. 12/359,248, filed Jan. 23, 2009, 12 pages.
U.S. Appl. No. 12/359,244, filed Jan. 23, 2009.
U.S. Appl. No. 12/359,248, filed Jan. 23, 2009.
U.S. Appl. No. 12/359,251, filed Jan. 23, 2009.
U.S. Appl. No. 12/359,896, filed Jan. 26, 2009.
Canadian Office Action issued in International Patent Application No. 2,785,040, dated Jul. 2, 2013, 3 pages.

* cited by examiner

SAMPLE RECEIPT

123 Main Street
Anywhere, CA 12345
555-555-5555

---

Store: 0001
Cashier: John Smith
Associate: 000001

---

CUSTOMER RECEIPT COPY

Original Transaction Information
    Register: 001
    Date: 01/01/2001

---

| | |
|---|---|
| SUBTOTAL: | 259.99 |
| SALES TAX: | 23.45 |
| TOTAL: | 283.44 |

---

AMOUNT TENDERED
  VISA                                           283.44
    ACCT: ************1234
    EXP: ******
    APPROVAL: SSS9999
    CARDHOLDER: Jane Smith
TOTAL PAYMENT               283.44

---

TRANSACTION: 12345     01/01/2001 2:22pm

FIG. 3

SYSTEM AND METHOD FOR PROCESSING PAYMENT TRANSACTION RECEIPTS

CROSS-REFERENCES TO RELATED APPLICATIONS

The present application is a continuation of non-provisional application U.S. Ser. No. 12/962,571, filed on Dec. 7, 2010, now U.S. Pat. No. 8,429,048 entitled "System and Method for Processing Payment of Transaction Receipts", which is a non-provisional of and claims priority to U.S. provisional Application No. 61/290,391, filed on Dec. 28, 2009, the entire contents of which are herein incorporated by reference for all purposes in their entirety.

BACKGROUND

The legacy process of transaction receipt generation at point-of-sale transactions involves generating a paper transaction receipt (e.g., charge-slip) and maintaining copies of the paper transaction receipt by both the consumer and the merchant. This existing process of paper-based transaction receipts has many issues associated with it. Such issues include the generation and safe-keep of paper transaction receipts by consumers and merchants, which is a major operational hassle. Additionally, the generation and safe-keep of paper transaction receipts involves extensive inventory management for paper, ink cartridges, and other consumables, which has cost and operational overhead. Furthermore, paper transaction receipts involve elaborate back-office setup at the merchant acquirer for retrieval and processing of transaction receipts in cases of disputes, which also has cost and operational overhead. Paper transaction receipts are also problematic in that frequent disputes arise due to erasure of contents on paper transaction receipts. These issues add substantial inefficiencies to the existing transaction process. Moreover, the emergence of new payment products and form factors warrants the need for new ways of managing transaction receipts that fit into the overall consumer experience.

Embodiments of the invention address these and other problems individually and collectively.

BRIEF SUMMARY

Embodiments of the invention are directed to systems and methods for processing payment transaction receipts.

One embodiment of the invention is directed to a method of sending electronic receipts to a consumer. The method includes receiving an authorization request message associated with a transaction, the authorization request message including transaction information associated with a portable consumer device of the consumer. A server computer associated with a payment processing network determines whether an account associated with the portable consumer device is enrolled in an electronic receipt program. An electronic receipt is sent to the consumer if the account is enrolled in the electronic receipt program. The electronic receipt has financial data associated with the transaction.

Another embodiment of the invention is directed to a server computer. The server computer includes an enrollment module having enrollment information associated with an account for a portable consumer device of a consumer. The enrollment information indicates enrollment in an electronic receipt program. The server computer also includes a payment processing module for receiving an authorization request message associated with a transaction of the portable consumer device. The authorization request message includes transaction information associated with the portable consumer device. The server computer further includes a mobile gateway module for sending an electronic receipt to the consumer if the enrollment information indicates the account is enrolled in the electronic receipt program. The electronic receipt has financial data associated with the transaction.

Yet another embodiment of the invention is directed to a method for receiving electronic receipts. The method includes sending an authorization request message associated with a transaction to a server computer associated with a payment processing network. The authorization request message includes transaction information associated with a portable consumer device of a consumer. The customer then receives an electronic receipt having financial data associated with the transaction if an account associated with the portable consumer device is enrolled in an electronic receipt program. The server computer determines whether the account is enrolled in the electronic receipt program.

These and other embodiments of the invention are described in further detail below.

BRIEF DESCRIPTION OF THE DRAWINGS

FIG. 3 depicts a sample receipt.

DETAILED DESCRIPTION

Figure 1:
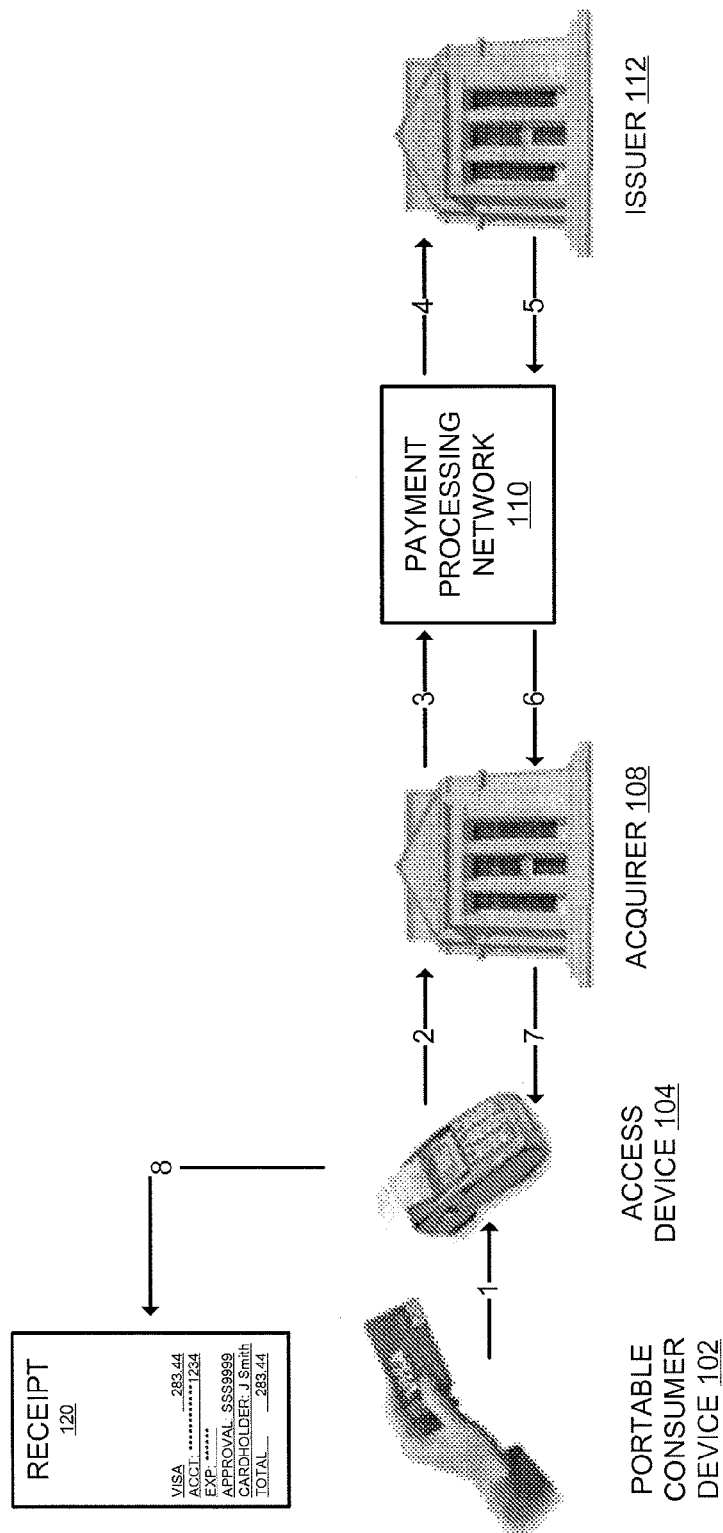
FIG. 1 depicts a system for generating paper receipts to the consumer.

Embodiments of the invention involve replacing the legacy process of transaction receipt (e.g. charge-slip) generation with a digital/electronic transaction receipt or equivalent record that is easier to safe-keep and that saves overall costs, such as processing and handling costs, in the process. Digitization of the transaction receipt generation and storage process solves many problems associated with the legacy process because the receipt would exist in electronic form and could be stored and sent over various electronic media. This process not only addresses the problems described above but also delivers an environmentally-friendly alternative to the existing model. Further, by providing receipts, the consumer can be notified of the transaction shortly after the transaction has taken place. This allows the consumer to take immediate action in the event that a transaction is potentially fraudulent or in the event that the transaction details are not accurate (e.g., the price on the receipt does not reflect the price that was intended to be paid).

Such embodiments for electronic receipts are also advantageous due to the increased deployment of personal identification numbers (PIN) and electromagnetic vulnerability (EMV) chip-based transactions that obviate the need for a consumer's signature on transaction receipts.

Transaction receipts are universally used in merchant and self-service terminals (e.g., ATMs) as a proof of transaction. A transaction receipt contains a record of a transaction and information including a card number, amount, date, merchant details, etc. In most cases, the merchant also provides a separate receipt with similar details and additionally a breakup of merchandise. Most transactions require multiple copies to be printed for safekeeping at the merchant, consumer, and the acquirer bank. This is largely a legacy of old imprint based card-transactions.

There are many issues with the existing paper transaction receipt system. Generation and safe-keeping of transaction receipts by a consumer and merchant are a major operational hassle. Extensive inventory management and servicing setup for paper, ink-cartridges, etc. is required for generating transaction receipt from a card terminal at a merchant. An elaborate back-office setup is required at the merchant/bank for retrieval and processing of transaction receipts in case of disputes. Frequent conflicts arise due to poor print quality and erasure of print which is an inherent drawback of the small printer used in terminals. Moreover, the existing paper system is environmentally unfriendly.

Embodiments of the invention essentially replace the paper-based credit card transaction receipt process with a more efficient electronic process. This is achieved through converting transaction receipts to an electronic format for easy storage and access, moving the task of generation of receipts away from the access device (i.e. point-of-sale terminal) at the merchant, moving unique information from the credit card receipt to other supplementary documentation used in the transaction, and providing consumers options to access receipts over multiple channels. With these embodiments, little or even no change is required from the merchant's end.

Based on various environmental factors, embodiments of the invention could take various manifestations. Examples of these are described below.

FIG. 1 shows the existing system and process for generating paper transaction receipts. The system of FIG. 1 includes portable consumer device 102, access device 104, acquirer 108, payment processing network 110, issuer 112, and receipt 120. FIG. 1 also depicts the interaction between these elements.

In a typical payment transaction, a consumer may purchase goods or services at the merchant using portable consumer device 102. The consumer may be an individual, or an organization such as a business that is capable of purchasing goods or services. Additionally, the consumer may operate a client computer to transact with the merchant. The client computer can be a desktop computer, a laptop computer, a wireless phone, a personal digital assistant (PDA), etc. The client computer may operate using any suitable operating system including a Windows™ based operating system. The client computer may be used to interact with a merchant (e.g., via merchant access device 104 or via a merchant website).

The payment transaction is initiated when the consumer uses portable consumer device 102 at access device 104, which is located at the merchant. Acquirer 108, which is a financial institution associated with the merchant, can receive the transaction information from access device 104 at the merchant. Acquirer 108 forwards the transaction information to payment processing network 110, which then forwards the transaction information to issuer 112 for approval of the transaction. Issuer 112 is a financial institution associated with portable consumer device 102. The approval (or denial) of the transaction is ultimately sent back to access device 104 for completion of the transaction.

Portable consumer device 102 is a payment device that may be in any suitable form. For example, portable consumer device 102 can be hand-held and compact so that it fits into a consumer's wallet and/or pocket (e.g., pocket-sized). Portable consumer device 102 may also be a smart card, ordinary credit or debit card (with a magnetic strip and without a microprocessor), a keychain device (such as the Speedpass™ commercially available form Exxon-Mobil Corp.), etc. Other examples of portable consumer devices include cellular phones, PDAs, pagers, payment cards, security cards, access cards, smart media, transponders, and the like. Portable consumer device 102 can also be a debit device (e.g., a debit card), credit device (e.g., a credit card), or stored value device (e.g., a stored value card). Portable consumer device 102 could also be in the form of a virtual account.

Figure 2A:
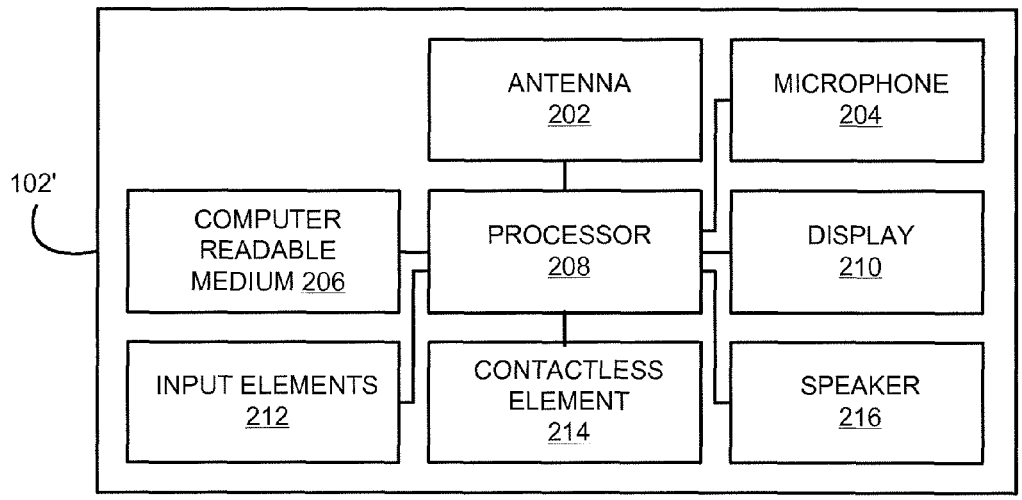
FIG. 2(a) and FIG. 2(b) depict various portable consumer devices.

FIG. 2(a) depicts an example of portable consumer device 102' in the form of a mobile phone. Computer readable medium 206 may be a memory that stores data and may be in any suitable form including a magnetic stripe, a memory chip, uniquely derived keys, encryption algorithms, etc. Computer readable medium 206 also preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. Any of this information may be transmitted by portable consumer device 102'.

Information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

Contactless element 214 is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between portable consumer device 102' and an interrogation device. Thus, portable consumer device 102' is capable of communicating and transferring data and/or control instructions via both cellular network and near field communications capability.

Portable consumer device 102' may also include processor 208 (e.g., a microprocessor) for processing the functions of portable consumer device 102' and display 210 to allow a consumer to see phone numbers and other information and messages. Portable consumer device 102' may further include input elements 212 to allow a consumer to input information into the device, speaker 216 to allow the consumer to hear voice communication, music, etc., and microphone 204 to allow the consumer to transmit her voice through portable consumer device 102'. Portable consumer device 102' may also include an antenna 202 for wireless data transfer (e.g., data transmission).

If portable consumer device 102 is in the form of a debit, credit, or smartcard, portable consumer device 102 may also optionally have features such as magnetic stripes. Such devices can operate in either a contact or contactless mode.

Figure 2B:
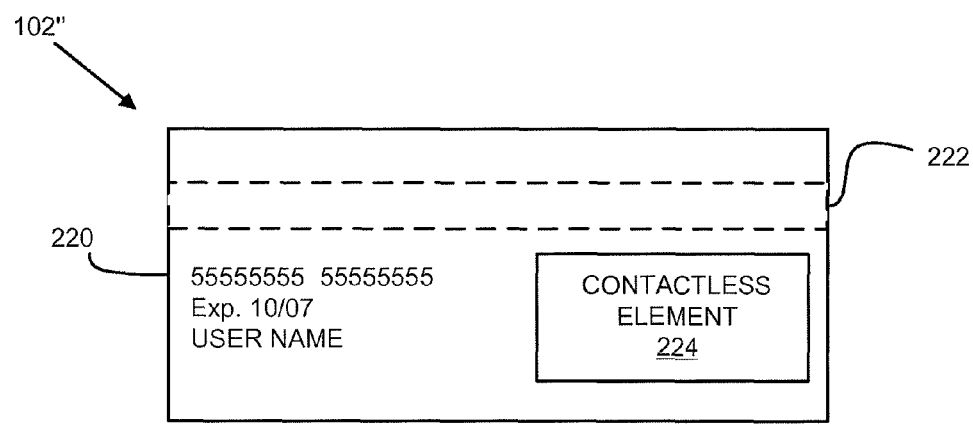

FIG. 2(b) depicts an example of portable consumer device 102" in the form of a payment card within a plastic substrate. A contactless element 224 for interfacing with access device 104 may be present on or embedded within the plastic substrate of 102". Consumer information 220 such as an account number, expiration date, and consumer name may be printed or embossed on the card. Also, magnetic stripe 222 may also be on the plastic substrate of payment card 102".

As shown in FIG. 2(b), the portable consumer device 102" may include both a magnetic stripe 222 and a contactless element 224. In other embodiments, both the magnetic stripe 222 and the contactless element 224 may be in portable consumer device 102". In other embodiments, either the magnetic stripe 222 or the contactless element 224 may be present in the portable consumer device 102".

Access device 104 is a device used to transmit transaction information from the merchant to acquirer 108. The merchant may be an individual or an organization such as a business that is capable of providing goods and services. The merchant's access device 108 can be any suitable access device with interfaces, including point of sale (POS) devices, cellular phones, PDAs, personal computers (PCs), tablet PCs, handheld specialized readers, set-top boxes, electronic cash registers (ECR), automated teller machines (ATM), virtual cash registers (VCR), kiosks, security systems, access systems, and the like. Access device 104 can interact with portable consumer device 102. For example, a consumer using a credit card to purchase a good or service can swipe it through an appropriate slot in access device 104. Alternatively, access device 104 may be a contactless reader, and portable consumer device 102 may be a contactless device such as a contactless card. As another alternative, a consumer may purchase a good or service via a merchant's website where the consumer enters the credit card information into the client computer and clicks on a button to complete the purchase. Additionally, the client computer may be considered an access device 104.

Acquirer 108 may be in operative communication with the issuer 112 of portable consumer device 102 via payment processing network 110. Acquirer 108 is typically a bank that has a merchant account. Issuer 112 may also be a bank, but could also be a business entity such as a retail store or a mobile phone or telecommunications company. Issuer 112 is the entity issuing portable consumer device 102 to the consumer. Some entities are both acquirers and issuers, and embodiments of the invention include such entities. Acquirer 108 and issuer 112 may each have a server computer and a database associated with the server computer.

Payment processing network 110 is located between (in an operational sense) acquirer 108 and the issuer 112. It may include data processing subsystems, networks, and operations used to support and deliver authorization services, exception file services, and clearing and settlement services. For example, payment processing network 110 may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

Payment processing network 110 may use any suitable wired or wireless network, including the Internet. Payment processing network 110 may have a server computer and a database associated with the server computer. The server computer may comprise a processor and a computer readable medium. The computer readable medium may comprise code or instructions for performing methods according to embodiments of the invention.

The process for conducting a transaction and generating paper transaction receipt 120 for the consumer, as depicted in FIG. 1, is as follows:

Step 1: The consumer offers portable consumer device 102 towards settling dues for a transaction at a merchant.

Step 2: The merchant processes the transaction with portable consumer device 102 using access device 104 and submits the transaction to acquirer 108 by sending an authorization request message to acquirer 104.

Step 3: Acquirer 108 forwards the authorization request message to payment processing network 110.

Step 4: Payment processing network 110 processes the authorization request message and sends it to issuer 112.

Step 5: Issuer 112 receives the authorization request message and approves the transaction appropriately by forwarding an authorization response message to payment processing network 110.

Step 6: Payment processing network 110 receives the authorization response message and forwards it to acquirer 108.

Step 7: Acquirer 108 forwards the authorization response message to access device 104 at the merchant.

Step 8: Access device 104 at the merchant receives the authorization response message indicating approval of the transaction at access device 104 and generates multiple copies of transaction receipt 120.

Based on the transaction environment, the consumer may be required to sign the merchant copy of transaction receipt 120. However, in some embodiments, a signature may not be a requirement for PIN and certain EMV chip transactions. FIG. 3 depicts an example of transaction receipt 120.

Figure 4:
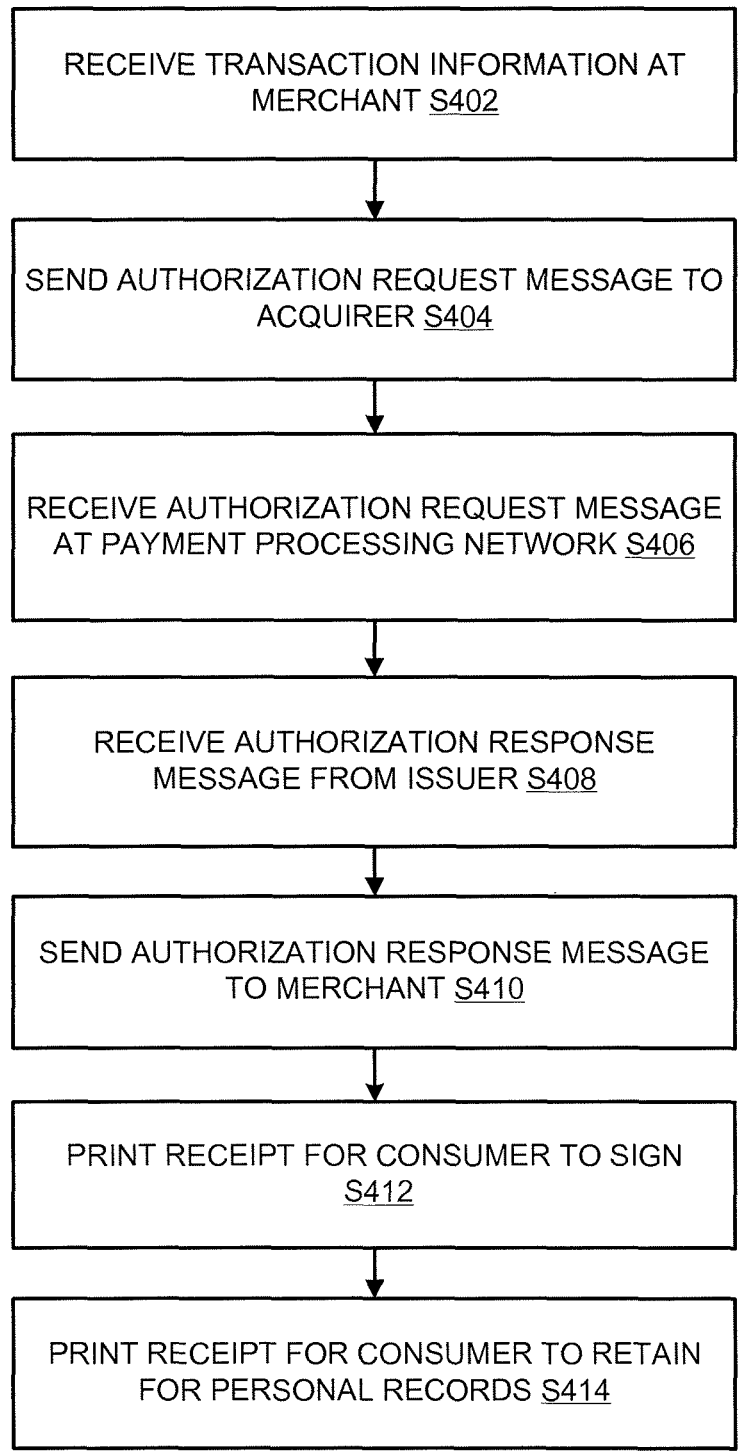
FIG. 4 is a flowchart for a method of generating a paper receipt associated with a transaction of the consumer.

FIG. 4 depicts a flow chart of a method for generating paper transaction receipts. When a consumer initiates a payment transaction for the purchase of goods or services from a merchant, the transaction information will be received by the merchant via access device 104 (step S402). Access device 104 generates an authorization request message containing the transaction details, including payment information associated with portable consumer device 102, and sends the authorization request message to acquirer 108 (step S404). The authorization request message is then sent from acquirer 108 to payment processing network 110 where it is received (S406). Payment processing network 110 forwards the authorization request message to issuer 112. Issuer 112 determines whether the transaction should be approved and sends an authorization response message indicating approval or denial to payment processing network 110 where it is received (S408). Payment processing network 110 then sends authorization response message to the merchant access device 104 via acquirer 108 (S410). Once the authorization response message is received at the merchant, access device 104 prints a transaction receipt for the consumer to sign (S412). Access device 104 also prints a transaction receipt for the consumer to retain for the consumer's personal records (S414).

Figure 5A:
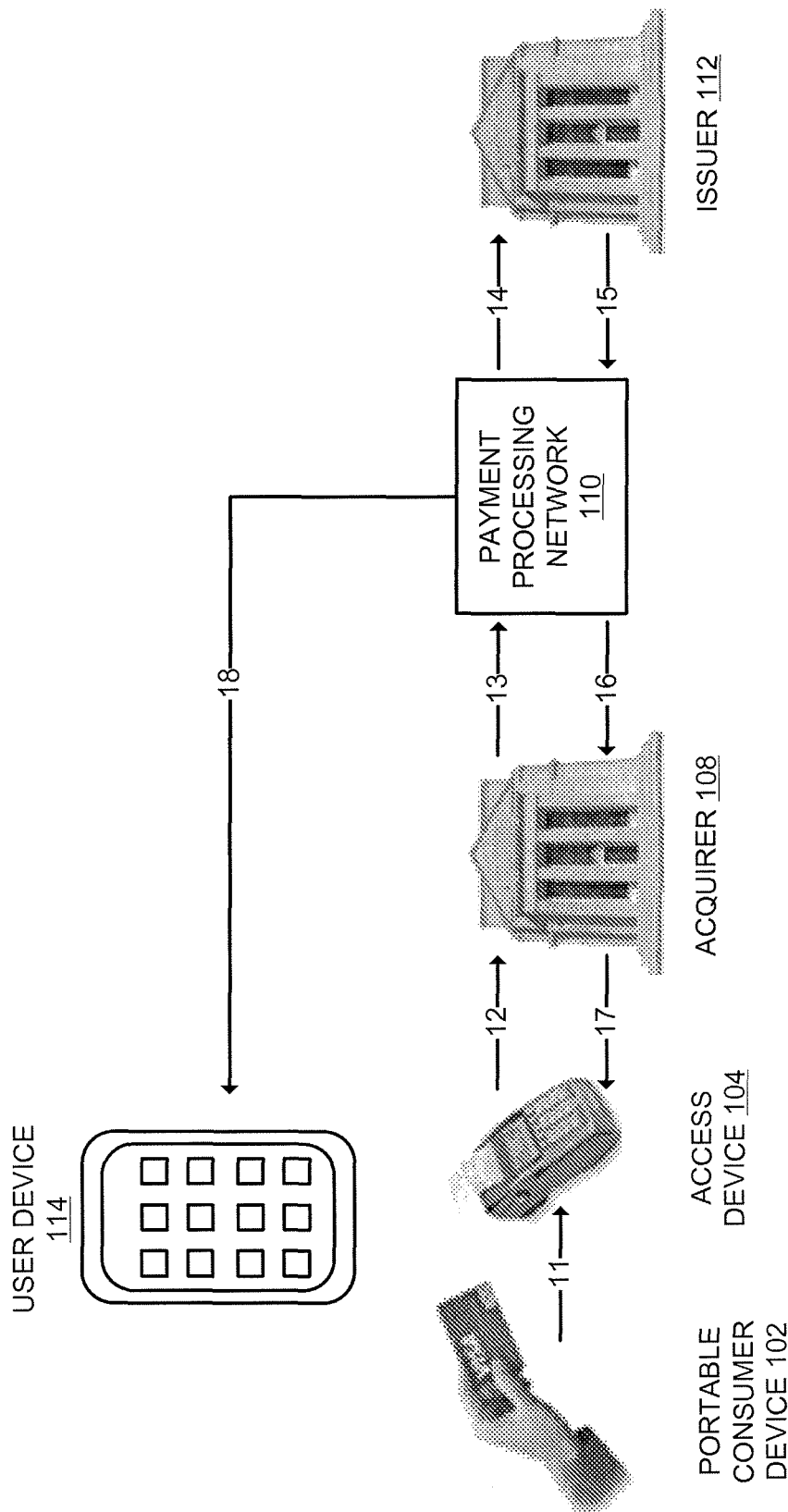
FIG. 5(a) and FIG. 5(b) depict various systems for generating electronic receipts to the consumer.
Figure 5B:
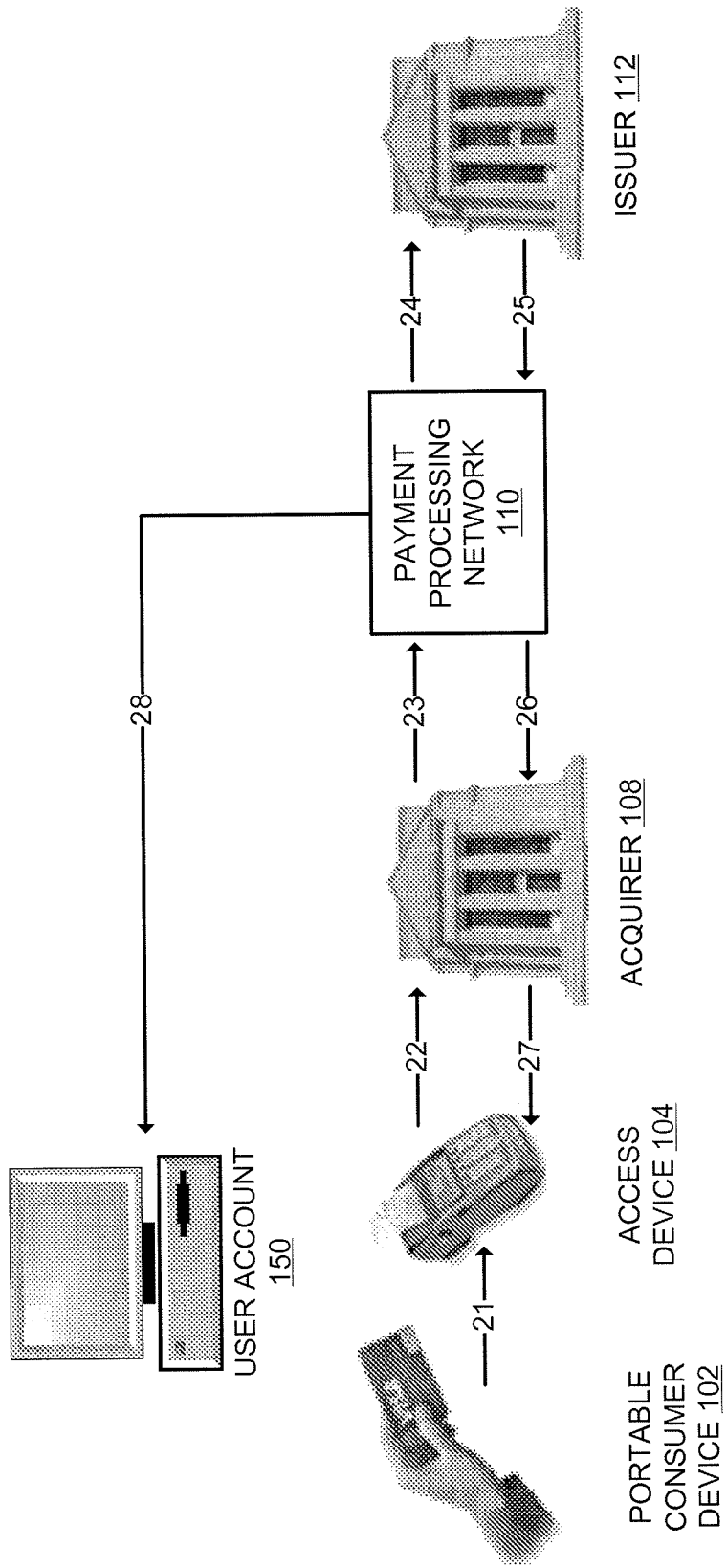

FIGS. 5(a) and 5(b) depict systems for generating electronic receipts. In one embodiment of the present invention, payment processing network 110 (or other suitable entity, such as issuer 112) creates a mobile-gateway to generate and send electronic transaction receipts as messages to registered or enrolled consumers. The consumer may enroll to receive transaction receipts in electronic form. The enrollment can be performed by the consumer in any suitable manner, such as a phone call to an enrollment center, through portable consumer device 102, through email, through a website for enrolling in the electronic receipt program, etc. Furthermore, the consumer can indicate whether the consumer wishes to stop receiving paper transaction receipts after a transaction or whether the consumer wishes to receive both the paper transaction receipt and the electronic transaction receipt. Additionally, the consumer can indicate how the consumer wishes to receive the electronic receipt (e.g. by email, text message, etc.).

FIG. 5(*a*) shows a system in accordance with an embodiment of the invention. The components (portable consumer device 102, access device 104, acquirer 108, payment processing network 110, issuer 112) are similar to those shown in FIG. 1. The process for generating an electronic receipt to user device 114 is described below. Note that user device 114 can be any device used by the consumer that is capable of receiving an electronic receipt, including but not limited to a mobile phone, PDA, pager, computer, etc.

Step 11: The consumer offers portable consumer device 102 towards settling dues for a transaction at a merchant.

Step 12: The merchant processes the transaction with portable consumer device 102 using access device 104 and submits the transaction to acquirer 108 by sending an authorization request message to acquirer 104.

Step 13: Acquirer 108 forwards the authorization request message to payment processing network 110.

Step 14: Payment processing network 110 processes the authorization request message, including determining whether the account associated with portable consumer device 102 is enrolled in an electronic receipt program. Payment processing network 110 sends the authorization request message to issuer 112.

Step 15: Issuer 112 receives the authorization request message and approves the transaction appropriately by forwarding an authorization response message to payment processing network 110.

Step 16: Payment processing network 110 receives the authorization response message and forwards it to acquirer 108.

Step 17: Acquirer 108 forwards the authorization response message to access device 104 at the merchant.

Step 18: Payment processing network 110 sends an electronic receipt to user device 114 if payment processing network 110 determines that the account associated with the consumer's portable consumer device 102 is enrolled in the electronic receipt program.

There are a number of advantages to allowing the payment processing network 110 (or a server computer located therein) to send the electronic receipt to the user device 114 after the authorization response message is received from the issuer 112. The payment processing network 110 can act as a "switch" between many different issuers and acquirers (not shown). Thus, a single modification to the payment system shown in FIG. 5 can provide transaction receipts to many different merchants associated with many different acquirers when transactions are made using many different portable consumer devices issued from many different issuers.

In step 18, the electronic receipt can be sent in any form suitable for user device 114. For example, the electronic receipt can be a short message service (SMS) message, a multi-media service (MMS) message (e.g. an image of receipt), an email, etc. It is important to note that the trigger for the electronic receipt could be completion of the online transaction successfully over payment processing network 110, indication of successful completion of transaction by acquirer 108, or at any other suitable point during the transaction. It is also important to note that user device 114 might also be the same device as portable consumer device 102.

The electronic receipt may include any or all of the data elements that are on a paper receipt (such as in FIG. 3). For example, the electronic receipt may include one or more of the following (e.g., at least a combination of 4, 5, 6 or more): a merchant identifier, a store identifier, a cashier identifier, a transaction date, a subtotal for the transaction, a sales tax amount, a total amount, a masked or partially masked payment card account number, a masked expiration date, an approval code, a date of transaction, a time of transaction, and a total payment amount. The transaction receipts may also have, in some cases, digital signatures from either a payment processor, or issuer, to verify its authenticity. That is, the electronic receipts may be used in place of paper receipts (or in addition to them) so the actual electronic receipt must be verifiable as being authentic.

Transaction receipts can also be distinguishable from transaction alerts. Transaction alerts are typically sent as a supplement to paper receipts. Also, transaction alerts typically do not include the same level of detail as transaction receipts, and are not used as proof that a transaction has occurred. Further, the electronic receipts can be used as proof that a transaction occurred, and can be used to return goods to a merchant or get a refund for goods or services.

FIG. 5(*b*) shows another embodiment of the system for generating electronic receipts. In this embodiment, payment processing network 110 (or issuer 112 in some embodiments) provides consumer access to electronic transaction receipts over an Internet portal. In other embodiments, the electronic transaction receipt can be sent as an email. Payment processing network 110 (or issuer 112) provides consumer access to electronic transaction receipts over an online portal by maintaining, for example, a website for accessing the consumer's online account associated with portable consumer device 102. The consumer may subscribe to the service. The process for generating and sending electronic receipts in this embodiment is as follows:

Step 21: The consumer offers portable consumer device 102 towards settling dues for a transaction at a merchant.

Step 22: The merchant processes the transaction with portable consumer device 102 using access device 104 and submits the transaction to acquirer 108 by sending an authorization request message to acquirer 104.

Step 23: Acquirer 108 forwards the authorization request message to payment processing network 110.

Step 24: Payment processing network 110 processes the authorization request message, including determining whether the account associated with portable consumer device 102 is enrolled in an electronic receipt program. Payment processing network 110 sends the authorization request message to issuer 112.

Step 25: Issuer 112 receives the authorization request message and approves the transaction appropriately by forwarding an authorization response message to payment processing network 110.

Step 26: Payment processing network 110 receives the authorization response message and forwards it to acquirer 108.

Step 27: Acquirer 108 forwards the authorization response message to access device 104 at the merchant.

Step 28: Payment processing network 110 sends an electronic receipt to the user account 150 if payment processing network 110 determines that the account associated with the consumer's portable consumer device 102 is enrolled in the electronic receipt program.

In step 28, electronic receipts are available to the consumer's online user account 150 over an internet portal. If the electronic receipt program is being offered by issuer 112, this could be a part of the consumer's regular online account access. It could alternately be sent to a consumer as an email.

In another embodiment of the present invention a merchant copy of the transaction receipt continues in paper form while the consumer copy is sent in electronic form. Legal reasons may make it necessary for the merchant to retain a signed paper copy of a consumer transaction receipt. The consumer may register or enroll to receive transaction receipts in electronic form. The merchant copy of the transaction receipt continues to be printed, however the consumer copy is processed in electronic form.

Figure 6:
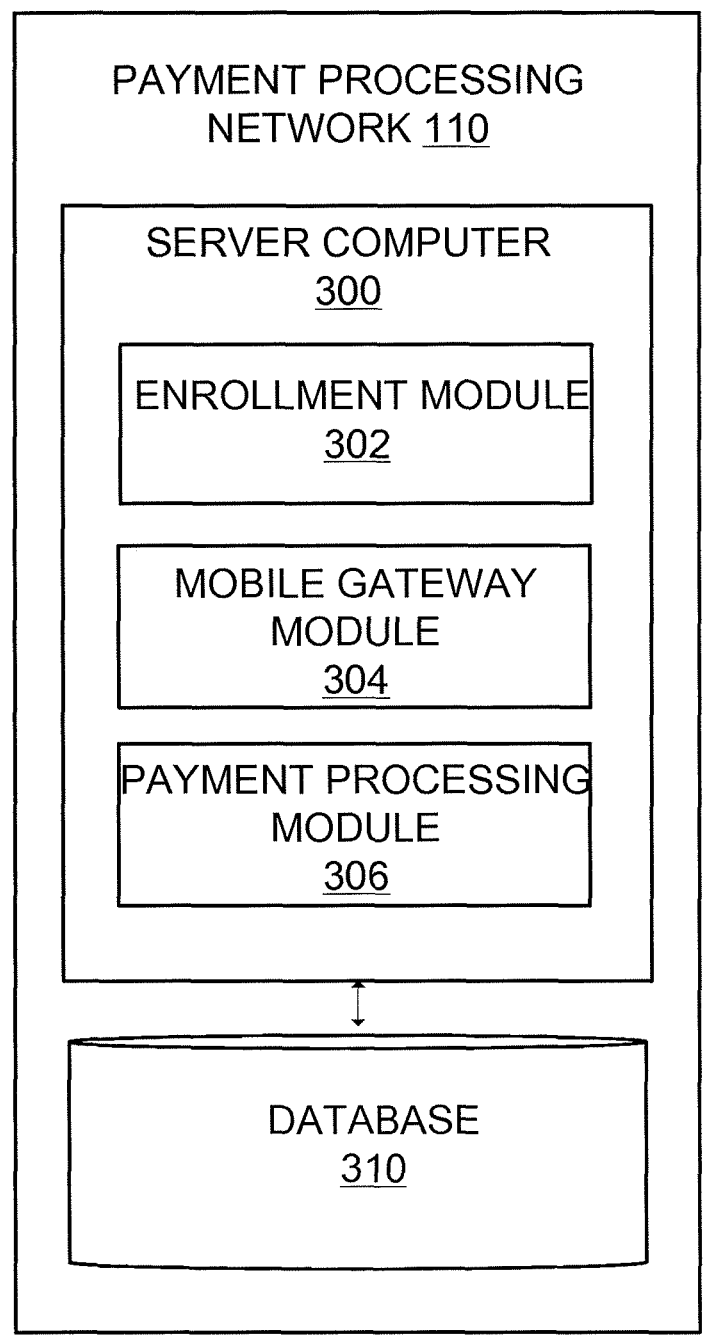
FIG. 6 depicts an exemplary payment processing network for generating electronic receipts to the consumer.

FIG. 6 depicts an example of payment processing network 110 in accordance with an embodiment of the invention. Payment processing network 110 includes a server computer 300 capable of accessing database 310. Server computer 300 also includes a processor for processing any computer-readable instructions stored on computer-readable media. Server computer 300 contains enrollment module 302, mobile gateway module 304, and payment processing module 306, each of which contains computer-readable instructions stored on computer-readable media for performing at least the functions described below. It should be noted that in other embodiments, the functionality of enrollment module 302, mobile gateway module 304, and payment processing module 306 can reside at issuer 112 or at any other suitable entity.

Enrollment module 306 may enroll a consumer in the electronic receipt program. As described above, enrollment can occur in any suitable manner, such as through a phone call, email, text, online enrollment, etc. That is, a consumer may request enrollment through any suitable means. Once a consumer is enrolled using enrollment module 306, the enrollment information may be sent and stored in database 310. The enrollment information can be subsequently accessed from database 310 during a consumer's transaction in order to determine whether the consumer is enrolled in the electronic receipt program. Enrollment module 306 uses the authorization request message or the authorization response message to look up an account and determine whether the account is enrolled in the electronic receipt program.

Mobile gateway module 304 may be used to provide the electronic receipt to the consumer, whether it is to the consumer's user device 114 or the online user account 150. Mobile gateway module 304 may be used in any suitable manner to notify the consumer that an electronic receipt is ready to be accessed.

Payment processing module 306 is the module that performs a typical payment transaction process. This module receives the authorization request message from acquirer 108, sends the authorization request message to issuer 112 for approval, receives the authorization response message from issuer 112, and sends the authorization response message to acquirer 108.

Figure 7:
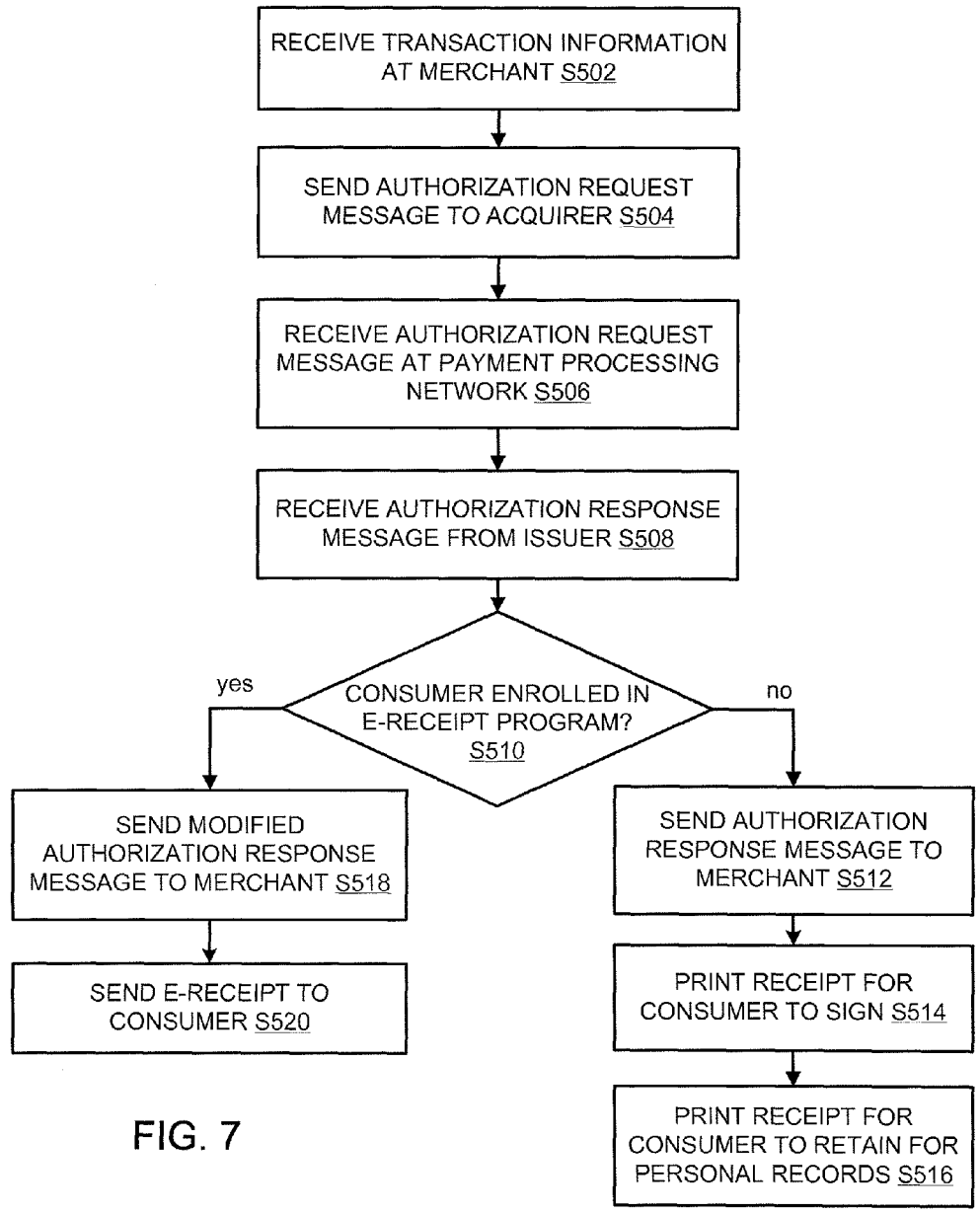
FIG. 7 is a flowchart for a method of generating an electronic receipt associated with a transaction of the consumer.

FIG. 7 depicts a flowchart of a method for generating electronic receipts in accordance with an embodiment of the invention. The merchant receives the transaction information at the merchant's access device 104. As discussed in detail above, the transaction information is received from the consumer's portable consumer device 102 and includes information such as the consumer's account information and purchase details (S502). Access device 104 generates an authorization request message with the transaction information and sends the authorization request message to acquirer 108 (S504). Acquirer then sends the authorization request message to payment processing network 110, where it is received (S506). The authorization request message is then forwarded to issuer 112, and issuer 112 generates an authorization response message indicating whether the transaction is authorized (i.e. whether there are sufficient funds in the consumer's account). Payment processing network 110 receives the authorization response message from issuer 112, including receiving transaction information associated with portable consumer device 102 (S508). Payment processing network 110 then determines (using either the authorization request message or authorization response message) whether the consumer's account is enrolled in the electronic receipt program by accessing the stored enrollment information in database 310 (S510). If the consumer's account is not enrolled in the electronic receipt program, a normal authorization response message is sent to the merchant via acquirer 108 and access device 104 (S512). A paper receipt is then printed by access device 104 for the consumer to sign (S514). Additionally, a paper receipt is printed for the consumer to retain for the consumer's personal records (S516).

If the consumer's account is enrolled in the electronic receipt program, payment processing network 110 will modify the authorization response message received from issuer 112 and send the modified authorization response message to the merchant via acquirer 108 and access device 104 (S518). The authorization response message received from issuer 112 is modified to include an indicator indicating enrollment in the electronic receipt program. Access device 104 can use this indicator to determine that a paper receipt should not be printed for the consumer. An electronic receipt is subsequently sent to the consumer via the consumer's user device 114 or user account 150 (S520).

Figure 8:
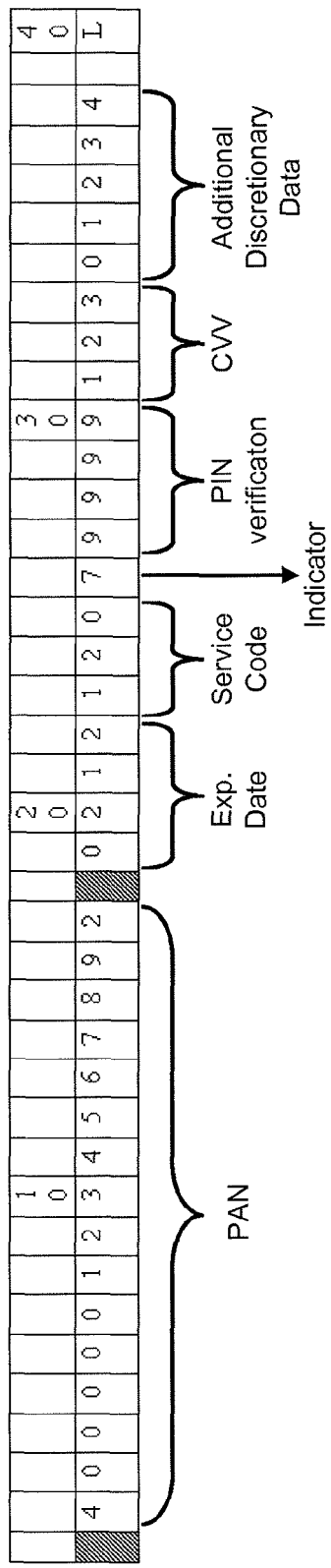
FIG. 8 depicts an exemplary format for indicating enrollment in an electronic receipt program.

FIG. 8 depicts one embodiment of a format for indicating the consumer's enrollment in the electronic receipt program in the authorization response message. This data can include the authorization response message received from issuer 112, including a primary account number (PAN), expiration date, service code, PIN verification, CVV data, and any additional discretionary data, such as whether the transaction is authorized. The original authorization response message can be modified to include or add an indicator, which indicates whether the account associated with portable consumer device 102 is enrolled in the electronic receipt program. Additionally, the original authorization response message can be modified to include or add any other enrollment information by modifying the additional discretionary data portion of the message. For example, the modification can indicate that the consumer also wants a printed receipt at the merchant or that a printed receipt should not be given.

Figure 9:
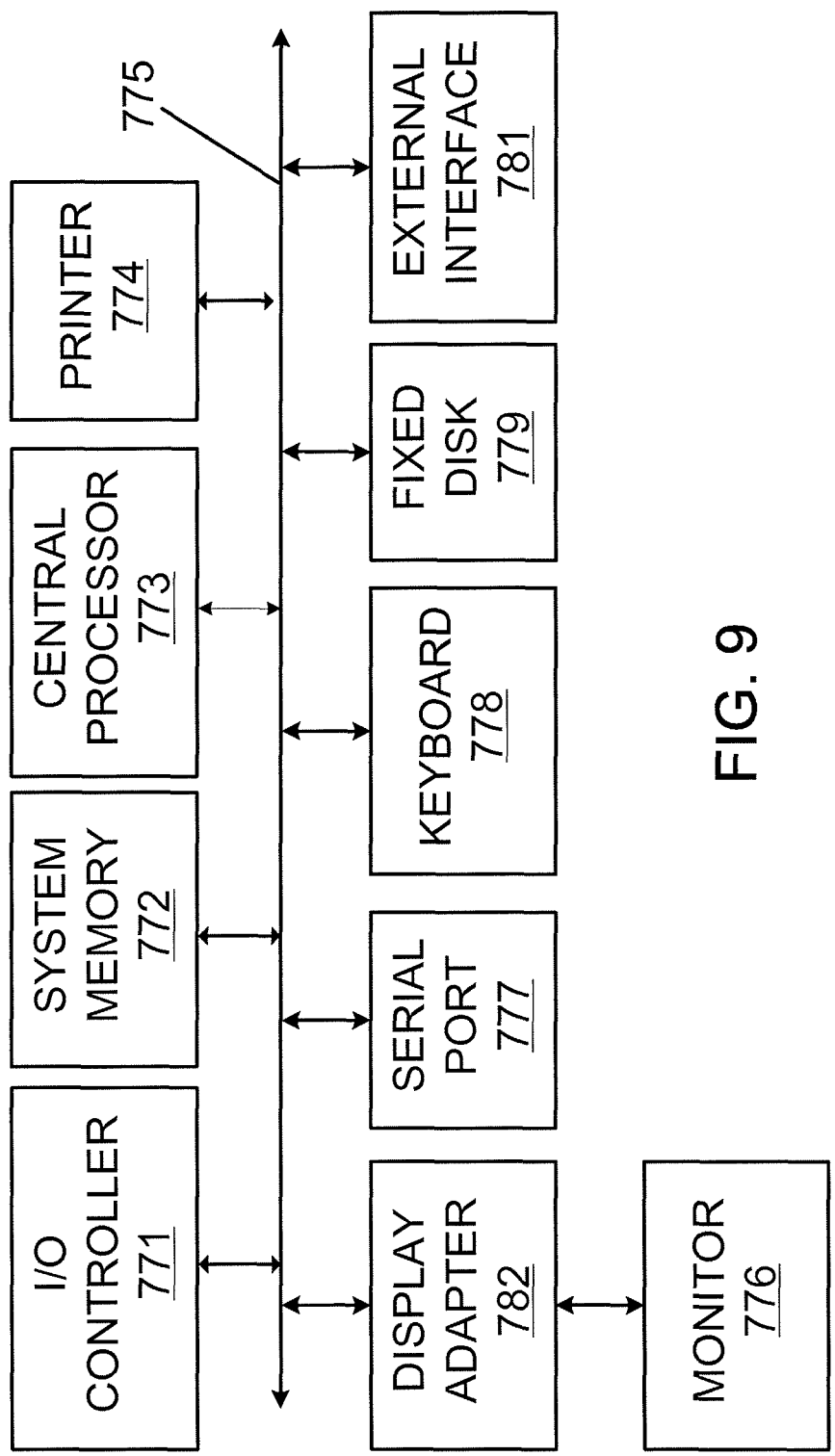
FIG. 9 depicts a block diagram of an exemplary computer apparatus.

The various participants (e.g., access device 104, merchant, acquirer 108, payment processing network 110, and issuer 112) and elements in FIGS. 1, 2(a), 2(b), 5(a), 5(b), and 6 may operate one or more computer apparatuses to facilitate the functions described herein. Any of those elements may use any suitable number of subsystems to facilitate the functions described herein. Examples of such subsystems or components are shown in FIG. 9. The subsystems shown in FIG. 9 are interconnected via a system bus 775. Additional subsystems such as a printer 774, keyboard 778, fixed disk 779 (or other memory comprising computer readable media), monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus 775 allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:
    receiving, at a computer apparatus, account information associated with a portable consumer device of a consumer;
    sending an authorization request message associated with a transaction, the authorization request message including the account information associated with the portable consumer device of the consumer;
    receiving an authorization response message from a server computer that includes an indicator that an account associated with the portable consumer device is enrolled in an electronic receipt program and indicates whether or not the consumer wants a printed receipt at the merchant, based on a determination using the authorization request message that the account associated with the portable consumer device is enrolled in an electronic receipt program; and
    determining, based on the indicator in the authorization response message, that a paper receipt should not be printed for the consumer, wherein an electronic receipt having financial data associated with the transaction is sent to the consumer.

2. The method of claim 1 wherein the portable consumer device is in the form of a virtual account.

3. The method of claim 1 wherein electronic receipt having financial data associated with the transaction is sent to the consumer via the portable consumer device.

4. The method of claim 1 wherein the electronic receipt includes at least one of the following data elements: a merchant identifier, a store identifier, a cashier identifier, a transaction date, a subtotal for the transaction, a sales tax amount, a total amount, a masked payment card account number, a masked expiration data, an approval code, a time of the transaction, and a total payment amount.

5. The method of claim 1 wherein the electronic receipt comprises a digital signature.

6. A computer apparatus comprising:
    a processor; and
    a computer readable medium coupled with the processor, the computer readable medium comprising code to be executed by a processor to perform the method of claim 1.

7. A method comprising:
    conducting a transaction using a portable consumer device wherein account information associated with the portable consumer device is received by a computer and an authorization request message associated with the transaction is sent that includes the account information associated with the portable consumer device of the consumer, and an authorization response message is received from a server computer that includes an indicator that an account associated with the portable consumer device is enrolled in an electronic receipt program and indicates whether or not the consumer wants a printed receipt at the merchant, based on a determination using the authorization request message that the account associated with the portable consumer device is enrolled in an electronic receipt program;
    receiving, at a computer apparatus, an electronic receipt having financial data associated with the transaction, based on the indicator in the authorization response message that the account associated with the portable consumer device is enrolled in an electronic receipt program that indicates whether or not the consumer wants a printed receipt at the merchant, based on a determination using the authorization request message that an account associated with the portable consumer device is enrolled in an electronic receipt program.

8. The method of claim 7 further comprising:
    requesting enrollment in an electronic receipt program to receive transaction receipts in electronic form indicating whether or not the consumer wants a printed receipt at the merchant.

9. The method of claim 7 wherein the electronic receipt comprises a digital signature.

10. The method of claim 7 wherein the portable consumer device is in the form of a virtual account.

11. The method of claim 7 wherein the computer apparatus is the portable consumer device.

12. The method of claim 7 wherein the computer apparatus is a mobile phone, PDA, pager, or computer.

13. A computer readable medium comprising code to be executed by a processor to perform the method of claim 7.

14. A method comprising:
    receiving at a server computer associated with a payment processing network, an authorization request message associated with a transaction, the authorization request message including transaction information associated with a portable consumer device in the form of a virtual account of the consumer;
    determining by the server computer associated with the payment processing network, using the authorization request message, whether the virtual account of the consumer is enrolled in an electronic receipt program; and sending, by the server computer associated with the payment processing network, an electronic receipt to the consumer based on determining that the virtual account of the consumer is enrolled in the electronic receipt program, the electronic receipt having financial data associated with the transaction.

15. The method of claim 14, further comprising:
receiving an authorization response message from an issuer in response to the authorization request message; and
generating a modified authorization response message by adding an indicator to the authorization response message based on determining that the virtual account of the consumer is enrolled in the electronic receipt program, wherein the indicator indicates the consumer is enrolled in the electronic receipt program.

16. The method of claim 14, further comprising:
sending the authorization response message with the indicator to a merchant facilitating the transaction, wherein the indicator indicates whether the merchant should provide a paper receipt to the consumer.

17. The method of claim 14, further comprising:
receiving from the consumer a request to enroll in the electronic receipt program; and
enrolling the consumer in the electronic receipt program.

18. The method of claim 14, further comprising:
maintaining a website for accessing an online account associated with the portable consumer device; and
sending the electronic receipt to the consumer via the online account.

19. The method of claim 14, wherein the electronic receipt is sent to a mobile phone associated with the consumer.

20. The method of claim 14 wherein the electronic receipt comprises a digital signature.

21. A server computer comprising:
a processor; and
a computer readable medium coupled with the processor, the computer readable medium comprising code to be executed by a processor to perform the method of claim 14.

* * * * *